(12) United States Patent
Guillaumet et al.

(10) Patent No.: US 12,411,270 B2
(45) Date of Patent: Sep. 9, 2025

(54) OPTICAL DIFFUSER

(71) Applicant: STMicroelectronics (Crolles 2) SAS, Crolles (FR)

(72) Inventors: Simon Guillaumet, Grenoble (FR); Benjamin Vianne, Le Cheylas (FR); Stephane Zoll, Froges (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 605 days.

(21) Appl. No.: 17/890,113

(22) Filed: Aug. 17, 2022

(65) Prior Publication Data

US 2023/0068198 A1    Mar. 2, 2023

(30) Foreign Application Priority Data

Aug. 26, 2021 (FR) ........................ 2108931

(51) Int. Cl.
*G02B 5/02* (2006.01)
(52) U.S. Cl.
CPC ......... *G02B 5/0278* (2013.01); *G02B 5/0242* (2013.01); *G02B 5/0268* (2013.01)

(58) Field of Classification Search
CPC ... G02B 5/0278; G02B 5/0268; G02B 5/0242
See application file for complete search history.

(56) References Cited

U.S. PATENT DOCUMENTS

| 11,150,388 | B2 | 10/2021 | Farys et al. |
| 2016/0018572 | A1 | 1/2016 | Katsuta et al. |
| 2017/0192137 | A1 | 7/2017 | Sakano et al. |
| 2025/0048760 | A1* | 2/2025 | Ho .................. H10F 39/811 |

FOREIGN PATENT DOCUMENTS

FR    3102298 A1    4/2021

* cited by examiner

*Primary Examiner* — Joseph L Williams
(74) *Attorney, Agent, or Firm* — SEED INTELLECTUAL PROPERTY LAW GROUP LLP

(57) ABSTRACT

The present description concerns an optical diffuser including a first layer having an electrically-conductive track formed therein, and a second layer, having the first layer resting thereon resting thereon, and having at least two electrically-conductive pillars extending across the entire thickness of the second layer formed therein. The second layer includes at least one first region located under the conductive track comprising no pillar.

20 Claims, 2 Drawing Sheets

OPTICAL DIFFUSER

This application claims the priority benefit of French patent application number FR2108931, filed on Aug. 26, 2021, entitled "Diffuseur optique", which is hereby incorporated by reference to the maximum extent allowable by law.

BACKGROUND

Technical Field

The present disclosure generally concerns electronic and optical systems and devices. The present disclosure more particularly applies to electronic and optical devices protected against electrostatic discharges and, in particular, to optical diffusers protected against electrostatic discharges.

Description of the Related Art

Most electronic devices and electronic and optical devices, or electro-optical devices, are likely to be damaged by electrostatic discharges.

Optical diffusers are optical devices enabling to diffuse the light originating from a source, and may comprise, in certain cases, electronic components, and thus be an electro-optical device.

There is a need to overcome all or part of the disadvantages of known optical devices.

BRIEF SUMMARY

There is a need for electronic and optical devices better protected against electrostatic discharges.

There is a need for optical diffusers better protected against electrostatic discharges.

An embodiment overcomes all or part of the disadvantages of known optical diffusers.

An embodiment provides an optical diffuser comprising:
- a first layer having an electrically-conductive track formed therein; and
- a second layer, having said first layer resting thereon, and having at last two electrically-conductive pillars extending across the entire thickness of said second layer formed therein, the second layer comprises at least one first region located under said conductive track comprising no pillar.

According to an embodiment, said first region is located under said conductive track and also extends at the periphery of said conductive track.

According to an embodiment, said first region is under said conductive track and at a maximum distance of 1.2 µm from said conductive track.

According to an embodiment, each of said pillars is inscribed within a right circular cylinder having a diameter in the range from 100 to 500 nm.

According to an embodiment, said pillars are arranged in a grating and spaced apart from one another by a pitch.

According to an embodiment, the pitch is greater than or equal to 400 nm.

According to an embodiment, said pillar(s) are made of a material selected from the group comprising: amorphous silicon, polysilicon, and any other material having an optical index different from that of the material of the second layer.

According to an embodiment, the electrically-conductive track comprises a conductive portion made of a first material surrounded with an encapsulation layer made of a second material.

According to an embodiment, the conductive portion has a width in the range from 200 to 400 nm.

According to an embodiment, the conductive portion has a width in the order of 320 nm.

According to an embodiment, the encapsulation layer has a width in the range from 400 to 800 nm.

According to an embodiment, the encapsulation layer has a width in the order of 570 nm.

According to an embodiment, the first material is selected from the group comprising: copper and indium-tin oxide.

According to an embodiment, the second material is silicon nitride.

Another embodiment provides a method of manufacturing a previously-described optical diffuser.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, the steps and elements that are useful for an understanding of the embodiments described herein have been illustrated and described in detail. In particular, the operation of an optical diffuser is not described in detail hereafter, the described embodiments having an operation similar to that of usual optical diffusers.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
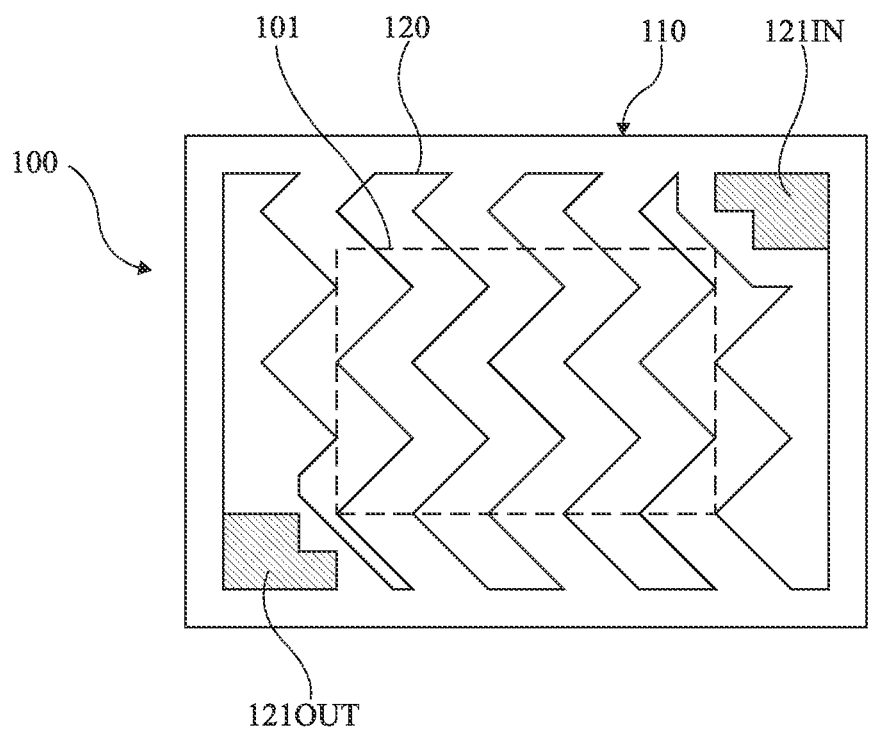
FIG. 1 shows a simplified top view of an embodiment of an optical diffuser.

FIG. 1 is a simplified top view of an embodiment of an optical diffuser 100.

Optical diffuser 100 is formed of a rectangular plate 110 having the feature of diffusing light. Plate 110 comprises a multitude of electrically-conductive pillars (not shown in FIG. 1) arranged in a grating, and enabling to diffuse light. Plate 110 is described in further detail in relation with FIG.

2. The active area of plate 110 is located at the center of plate 110 and is designated with dotted lines 101.

Optical diffuser 100 further comprises a device for monitoring the integrity of diffuser 100 formed of an electrically-conductive track 120, for example, a metal track, and connection pads 121IN and 121OUT enabling to connect the metal track to a circuit (not shown in FIG. 1) for monitoring the optical diffuser. According to an example, the monitoring circuit is located inside and/or on top of another printed circuit chip or card independent from optical diffuser 100. According to an example, the monitoring circuit is and/or contains a readout circuit.

Track 120 is intended to verify the integrity of optical diffuser 100 and is placed to cover a large portion of the surface of plate 110. More particularly, track 120 starts from one of the connection pads, for example, pad 121IN, arranged in a first corner of plate 110, for example, the upper right corner in FIG. 1, and ends at the level of the second connection pad, for example, pad 121OUT, arranged in a second corner opposite to first corner 121IN, for example, the lower left corner in FIG. 1. To cover the largest possible space of plate 110, track 120 is arranged, for example, in the form of a coil on plate 110, or for example in the form of a herringbone coil as illustrated in FIG. 1. It will be within the abilities of those skilled in the art to adapt the shape of track 120 to the accuracy of the desired monitoring, according to the targeted application.

The simplified operation of track 120 and of pads 121IN and 121OUT is the following. A current is sent, by the monitoring circuit, into track 120 from one of the connection pads, for example pad 121IN, and crosses it all the way to the other pad, for example, pad 121OUT. If optical diffuser 100 has been physically damaged, track 121 has certainly also been damaged. In other words, a crack in the plate 110 of diffuser 100 would generate a crack in track 120, which would prevent it from conducting current. The second connection pad, for example, pad 121OUT, receiving no current thus enables the monitoring circuit to deduce therefrom that diffuser 100 has been damaged. Thereby, via connection pads 121IN and 121OUT, the monitoring circuit detects a problem concerning the integrity of diffuser 100.

Figure 2:
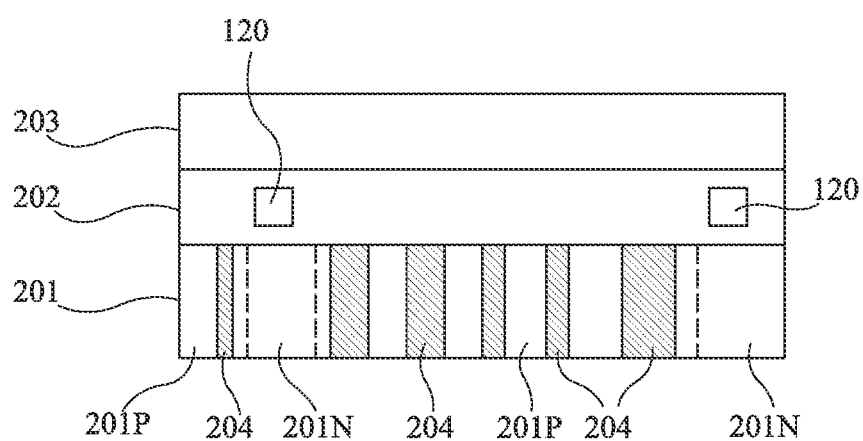
FIG. 2 schematically shows a cross-section view of a portion of the embodiment of FIG. 1.

FIG. 2 is a schematic and simplified cross-section view of a portion of the active area of the embodiment of the optical diffuser 100 described in relation with FIG. 1.

As previously mentioned, optical diffuser 100 is formed of plate 110, having the feature of diffusing light, and of conductive track 120.

In practice, optical diffuser 100 is a stack of layers comprising, at least:
- a first layer 201 forming plate 110;
- a second layer 202 having track 120 formed therein, second layer 202 resting on top of, and for example in contact with, first layer 201; and
- a third layer 203 resting on top of, and for example in contact with, second layer 202.

First layer 201 is a layer of a non-electrically conductive material, for example, silicon dioxide. According to an embodiment, first layer 201 comprises a region 201P having a pillar grating 204 formed therein, and another region 201N having no pillar formed therein (e.g., includes the non-electrically conductive material without any pillars). Each pillar 204 extends across the entire thickness of layer 201, and has a length in the range from 500 nm to 1.2 μm, for example, in the order of 650 nm. Pillars 204 have a shape, which is inscribed within a cylinder, but may be of cylindrical shape. Pillars 204 have different diameters, which enable to define the light diffusion characteristic of layer 201. Pillars 204 have a diameter in the range from 100 to 500 nm, and are spaced apart from one another by a pitch greater than or equal to 400 nm. Pillars 204 are made of a material selected from the group comprising: amorphous silicon, polysilicon, and any other material having an optical index different from that of the material of layer 201. Remaining portions of the first layer 201 are made of the non-electrically conductive material, such as, silicon dioxide.

Second layer 202 is a layer of a non-electrically conductive material, for example, silicon dioxide, having electrically-conductive track 120 formed therein. Second layer 202 has a thickness in the range from 200 nm to 1.5 μm, for example in the order of 730 nm. Track 120 is made of a conductive material, for example, of a metal or of an alloy of metals. According to an example, track 120 may be made of a plurality of materials, for example, a first material forming the conductive portion of track 120 and a second material forming an encapsulation layer for track 120 (not shown in FIG. 2, but shown in FIG. 3). The encapsulation layer of track 120 may for example enable to block the diffusion of atoms from the material of the conductive portion into the material of the layer having track 120 formed therein. According to an example of embodiment, the conductive portion of track 120 is made of a metal or of a metal alloy, more particularly, of copper. According to another example, the conductive portion of track 120 is made of indium-tin oxide (ITO), or of any other conductive material transparent to the light source sending the light received by optical diffuser 100. According to an example of embodiment, the material of the encapsulation layer is silicon nitride (SiN). According to an embodiment, the region 210N of layer 201 comprising no conductive pillar is located under conductive track 120. In other words, no electrically-conductive pillar is arranged under conductive track 120. According to an embodiment, region 201N extends at the close periphery of the conductive track, which is detailed in relation with FIG. 3. Indeed, the inventors have shown that the pillars 204 arranged under, or at the periphery of, the conductive track were likely to favor the occurrence of electrostatic discharges.

Third layer 203 is a transparent layer used as a mechanical support for diffuser 100, for example, a glass layer. Second layer 203 has a thickness in the range from 250 to 350 μm.

Figure 3:
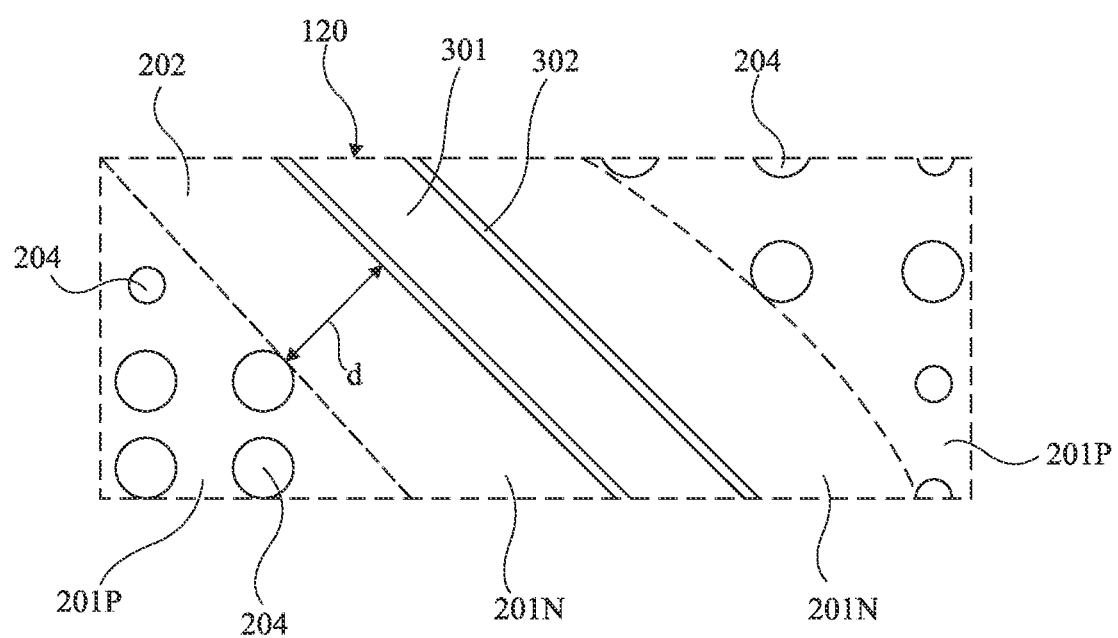
FIG. 3 schematically shows a top view of a portion of the embodiment of FIG. 1.

FIG. 3 is a top view of a portion of the active area of optical diffuser 100.

In the embodiment of FIG. 3, conductive track 120 is formed of a conductive portion 301, or of a central band or core, made of a first material and of an encapsulation layer 302 made of a second material forming, in FIG. 3, lateral bands, but totally covering conductive portion 301. For example, the conductive portion 301 is spaced from the second layer 202 by the encapsulation layer 302. According to an example, conductive portion 301 has a width in the range from 200 to 400 nm, for example, in the order of 320 nm. Encapsulation layer 302 has a width in the range from 400 to 800 nm, for example, in the order of 570 nm.

Further, in the embodiment of FIG. 3, pillars 204 are arranged at a distance from conductive track 120, for example, at a distance d greater than or equal to 1.2 μm. In other words, region 201N has, in top view, a shape similar to the shape of track 120 but having a greater width than track 120. Stated differently, the pillars 204 are laterally spaced from portions of the first layer 201 that directly underlie the conductive track 120 by a distance d greater than or equal to 1.2 μm.

An advantage of this embodiment is that it enables to decrease the damage caused by electrostatic discharges.

Another advantage of this embodiment is that a method of manufacturing this embodiment is identical to the method of manufacturing an optical diffuser where the first layer comprises region 210P, that is, comprises a grating of conductive pillars arranged all over the surface of the first layer. The method of manufacturing the embodiment described herein simply comprises one masking step as compared with method of manufacturing a usual optical diffuser.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

An optical diffuser (100) may be summarized as including a first layer (202) having an electrically-conductive track (120) formed therein; and a second layer (201), having said first layer (202) resting thereon, and having at least two electrically-conductive pillars (204) extending across the entire thickness of said second layer (201) formed therein, the second layer (202) comprises at least one first region (201N) located under said conductive track (120) comprising no pillar.

The first region (201N) may be located under said conductive track (120) and may also extend at the periphery of said conductive track (120).

The first region (201N) may be under said conductive track (120) and at a maximum distance of 1.2 µm from said conductive track (120).

Each of the pillars (204) may be inscribed within a right circular cylinder having a diameter in the range from 100 to 500 nm.

The pillars (204) may be arranged in a grating and spaced apart from one another by a pitch.

The pitch may be greater than or equal to 400 nm.

The pillars (204) may be made of a material selected from the group including amorphous silicon, polysilicon, and any other material having an optical index different from that of the material of the second layer (201).

The electrically-conductive track (120) may include a conductive portion (301) made of a first material surrounded with an encapsulation layer (302) made of a second material.

The conductive portion (301) may have a width in the range from 200 to 400 nm.

The conductive portion (301) may have a width in the order of 320 nm.

The encapsulation layer (302) may have a width ranging between 400 and 800 nm.

The encapsulation layer (302) may have a width in the order of 570 nm.

The first material may be selected from the group comprising: copper and indium-tin oxide (ITO).

The second material may be silicon nitride.

A method of manufacturing an optical diffuser (100) may be summarized as including forming a first layer (202) having an electrically-conductive track (120) formed therein; and forming a second layer (201), having said first layer (202) resting thereon, and having at least two electrically-conductive pillars (204) extending across the entire thickness of said second layer (201) formed therein, the second layer (202) comprises at least one first region (201N) located under said conductive track (120) comprising no pillar.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical diffuser comprising:
a first layer having an electrically-conductive track; and
a second layer, said first layer being on the second layer, the second layer having at least two electrically-conductive pillars extending across the entire thickness of said second layer, the second layer including at least one first region that is located under said conductive track and that includes no pillar.

2. The optical diffuser according to claim 1, wherein said first region is located under said conductive track and extends along a periphery of said conductive track.

3. The optical diffuser according to claim 1, wherein said first region is under said conductive track and at a maximum distance of 1.2 micrometers from said conductive track.

4. The optical diffuser according to claim 1, wherein each of said pillars is inscribed within a right circular cylinder having a diameter in a range from 100 to 500 nanometers.

5. The optical diffuser according to claim 1, wherein said pillars are arranged in a grating and spaced apart from one another by a pitch.

6. The optical diffuser according to claim 5, wherein the pitch is greater than or equal to 400 nanometers.

7. The optical diffuser according to claim 1, wherein said pillars are made of a material selected from a group of materials including: amorphous silicon, polysilicon, and a material having an optical index different from that of a material of the second layer.

8. The optical diffuser according to claim 1, wherein the electrically-conductive track includes a conductive portion made of a first material surrounded with an encapsulation layer made of a second material.

9. The optical diffuser according to claim 8, wherein the conductive portion has a width in a range from 200 to 400 nanometers.

10. The optical diffuser according to claim 8, wherein the conductive portion has a width in the order of 320 nanometers.

11. The optical diffuser according to claim 8, wherein the encapsulation layer has a width ranging between 400 and 800 nanometers.

12. The optical diffuser according to claim 8, wherein the encapsulation layer has a width in the order of 570 nm.

13. The optical diffuser according to claim 8, wherein the first material is selected from a group of materials including: copper and indium-tin oxide.

14. The optical diffuser according to claim 8, wherein the second material is silicon nitride.

15. A method of manufacturing an optical diffuser, the method comprising;
forming a first layer;
forming an electrically-conductive track in the first layer;
forming a second layer, the first layer being on the second layer; and
forming at least two electrically-conductive pillars in the second layer, the pillars extending across the entire thickness of the second layer, the second layer including at least one first region that is located under the conductive track and that includes no pillar.

16. The method of claim 15, wherein the second layer includes a first material having a first optical index, and the pillars include a second material having a second optical index different from the first material.

17. An optical diffuser, comprising:
- a first layer have a first surface and a second surface opposite to the first surface;
- a plurality of conductive pillars in the first layer and extending from the first surface to the second surface of the first layer, the plurality of conductive pillars being spaced from each other by portions of the first layer;
- a second layer on the second surface of the first layer; and
- a conductive track in the second layer and spaced from the second surface of the first layer by the second layer, the conductive track directly overlying the portions of the first layer.

18. The optical diffuser of claim 17, wherein the conductive track includes a conductive core and an encapsulation layer on the conductive core.

19. The optical diffuser of claim 17, wherein each of the plurality of conductive pillars is spaced from at least one of the portions of the first layer by a distance greater than or equal to 1.2 micrometers.

20. The optical diffuser of claim 17, further comprising:
- a transparent layer on the second layer, the conductive track being spaced from the transparent layer by the second layer.

* * * * *